Aug. 5, 1969  C. F. LE GRADY  3,459,214
FLOAT CONTROLLED METERING AND SHUTOFF VALVE
Filed Feb. 13, 1967
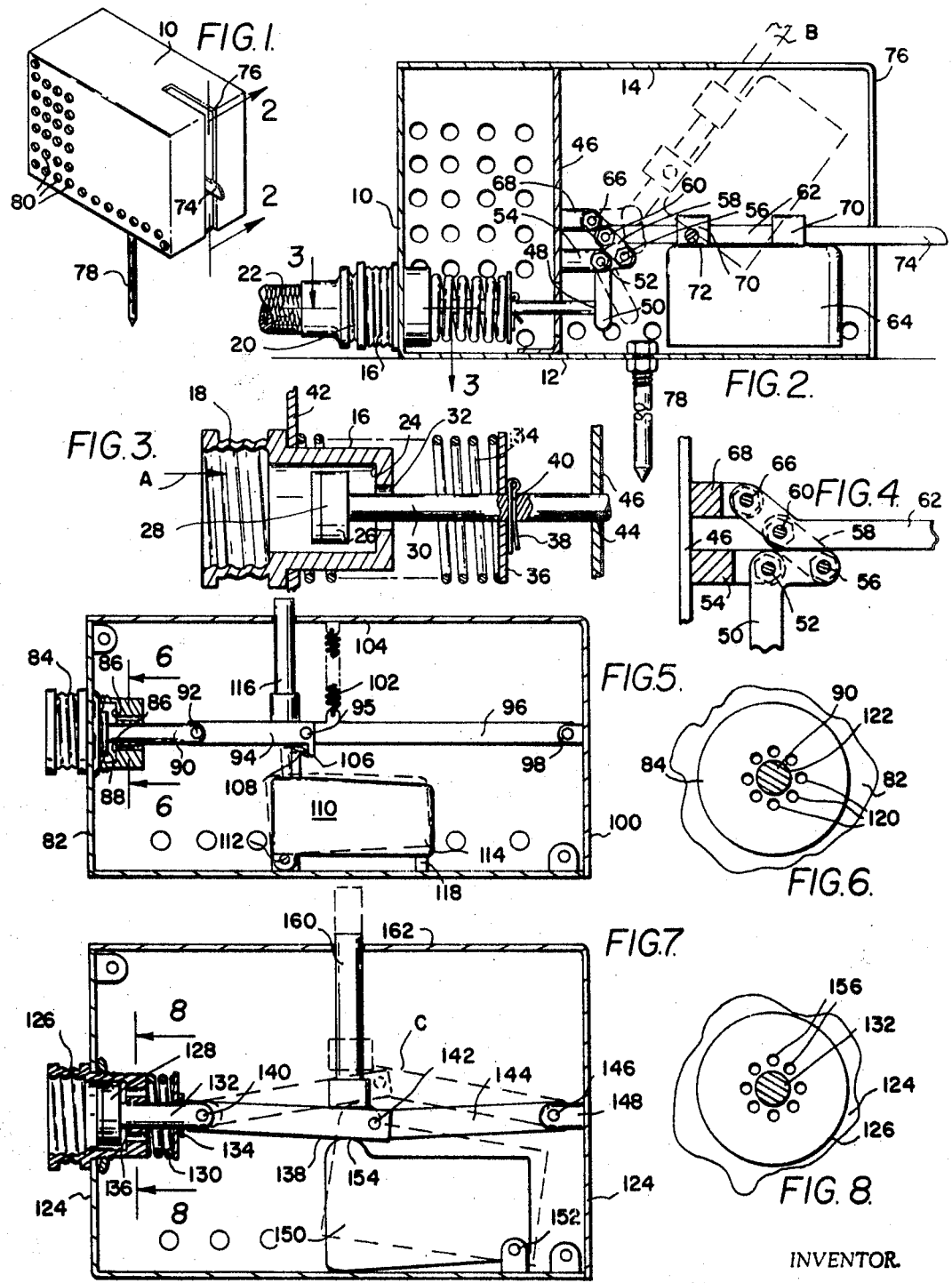
INVENTOR.
CARL F. LeGRADY
BY
Wm H. Dean United States Patent Office 3,459,214
Patented Aug. 5, 1969

3,459,214
FLOAT CONTROLLED METERING AND SHUTOFF VALVE
Carl F. Le Grady, 2513 E. Montecito,
Phoenix, Ariz. 85016
Filed Feb. 13, 1967, Ser. No. 615,573
Int. Cl. F16k *31/26, 1/42*
U.S. Cl. 137—420　　　　　　　　　　　　　　　　13 Claims

ABSTRACT OF THE DISCLOSURE

A float controlled metering and shutoff valve, wherein a toggle mechanism, when in over center position, holds a valve member open against liquid pressure, and wherein a float is adapted to respond to a rise in liquid level of liquid passing through the valve so as to cause said toggle means to be moved away from said over center position by a pressure of liquid tending to close said valve, such that said valve is closed by liquid pressure, when said float causes said toggle mechanism to pivot and permit said valve to close under pressure of liquid passing therethrough.

---

This invention relates to a float controlled metering and shutoff valve, and more particularly, to a float controlled metering and shutoff valve, which may be connected with a pressure fluid supply conduit, such as a flexible hose or the like, and which may be used for filling or partially filling various containers, reservoirs, and other areas to a desired level, whereupon flow through the conduit is automatically shut off.

Many float valves have been used, in accordance with prior art teachings, for maintaining a fluid level substantially constant in a tank or reservoir, and such float valves are generally secured in fixed position to the tank or reservoir, and other prior art systems for metering and shutting off water, include timers which permit water to flow for a given length of time.

The time controlled water metering and shutoff valves depend to a certain extent upon the water pressure values for the dispensation of a given amount of water in a given amount of time. Accordingly, such time controlled shutoff valves may dispense a varying volume of water in a given length of time.

In the filling of tanks and reservoirs, and particularly those reservoirs surrounding tree trunks, and in horticultural areas, including flower boxes, and other similar areas, it has been difficult to control filling or irrigating of these areas in a simple automatic manner.

Accordingly, it is an object of the present invention to provide a portable float controlled metering and shutoff valve mechanism, which may be connected to the end of a flexible garden hose or similar conduit adapted to conduct liquid under pressure, whereby the invention may be disposed in a tank or water receiving depression adjacent a tree trunk or in a flower box so that water may be dispensed into the depression or flower box to a level of a float of the invention, whereby the float actuates a toggle mechanism which permits the valve of the invention to close, and automatically shut off flow of water into the depression or other similar area.

Another object of the invention is to provide a very simple and novel portable float controlled metering and shutoff valve which may be moved from place to place in connection with the end of a flexible garden hose, and which may be quickly set to dispense water to a float level, and which may automatically shut off, when the float rises on the water dispensed therefrom automatically to shut off flow, and whereby the valve float and toggle mechanism of the invention may be very quickly and simply manually reset for the next successive float controlled liquid dispensing operation of the invention.

Another object of the invention is to provide a very novel float controlled metering and shutoff valve mechanism, which is very compact, and conveniently usable in connection with the end of a flexible hose, or the like.

Another object of the invention is to provide a novel float controlled metering and shutoff valve particularly adapted for use in connection with the end of a garden hose, and which has very simple toggle mechanism for controlling operation of a spring loaded poppet valve which is spring loaded toward closed position, and which is also adapted to be forced toward closed position by water pressure, and wherein the float of the invention tends to move the toggle mechanism of the invention in a direction to permit the valve of the invention to close.

Other objects and advantages of the invention may be apparent from the following specification, appended claims, and accompanying drawings, in which:

FIG. 1 is a perspective view of a float controlled metering and shutoff valve mechanism, in accordance with the present invention;

FIG. 2 is a sectional view taken from the line 2—2 of FIG. 1, showing parts and portions in elevation to facilitate the illustration and indicating by broken lines, a varying position of the float and toggle mechanism of the invention;

FIG. 3 is an enlarged fragmentary sectional view of the poppet valve mechanism of the invention, taken from the line 3—3 of FIG. 2;

FIG. 4 is an enlarged fragmentary view of the toggle mechanism of the invention, as shown in FIG. 2;

FIG. 5 is a sectional view similar to FIG. 2, but showing a modified form of the invention;

FIG. 6 is an enlarged sectional view taken from the line 6—6 of FIG. 5;

FIG. 7 is another view similar to FIG. 2, but showing a further modified form of the invention; and FIG. 8 is an enlarged fragmentary sectional view taken from the line 8—8 of FIG. 7.

As shown in FIGS. 1 and 2, the float controlled metering and shutoff valve of the invention is provided with a box-like frame 10 generally forming a housing for the mechanism of the invention. This frame 10 is composed of a base frame structure 12, and a cover structure 14 removably connected thereto.

Secured to the frame 10 is a poppet valve housing 16 having an internally screw threaded bore 18 adapted to receive and conform with an externally screw threaded collar 20 of a conventional garden hose 22 or another other equivalent pressure fluid conduit.

The poppet valve housing 16 is provided with a seat 24 engageable with a poppet head 26 of a movable valve member 28 having a stem 30 projecting through an opening 32 in the housing 16, said opening 32 being substantially larger than the stem 30 to permit flow of water or other liquid around the stem 30.

A compression spring 34 is secured to the stem 30 by means of a washer 36 abutting a cotter pin 38 extending through an opening 40 in the stem 30. The opposite end of the spring 34 abuts an inner surface 42 of an end wall of the frame, thus, the spring 34 tends to close the poppet head 26 on the seat 24 to prevent flow of water under pressure through the valve.

It will be noted that the valve housing is adapted to receive the flow of water under pressure in the direction of an arrow A in FIG. 3 of the drawings, which tends to close the poppet 26 on the seat 24.

The stem 30 of the poppet valve projects through a guide opening 44 in bulkhead 46 of the frame 10, and an extending end 48 of the stem 30 engages a lever 50 which is substantially L-shaped, and pivoted on a pin 52 to a support 54 carried by the bulkhead 46. A pin 56 passes through an end of the L-shaped lever 50, and through a toggle link 58. A pin 60 passes through the opposite end of the link 58, and also passes through a lever 62 which supports a float 64, as will be hereinafter described.

The lever 62 is pivotally connected by means of a pin 66 to a support 68 carried by the bulkhead 46.

The three pins 52, 56 and 66 may pass over center relative to each other forming a toggle mechanism of the lever 62, the link 58, and the lever 50.

The float 64 is provided with supports 70 slidably mounted on the lever 62 to adjust the buoyancy force center of the float 64 relative to the toggle mechanism comprising the pins 56, 60 and 66, and the levers and links, hereinbefore described. A set screw 72 in connection with one of the elements 70 may be tightened to fix the float 64 in certain adjusted position longitudinally of the lever 62, as desired.

An end 74 of the lever 62 projects through a slotted portion 76 in the cover 14 of the frame 10. This end 74 may be manually operable to reset the toggle mechanism of the invention, as will be hereinafter described.

Secured to the bottom of the frame 10 is a spike 78 which may be projected into the ground to support the float controlled metering and shutoff valve of the invention in juxtaposition relative thereto.

The housing structure of the frame 10 is provided with a plurality of openings 80 therein to permit water to pass outwardly therefrom, when dispensed by the valve mechanism of the invention, as will be hereinafter described in detail.

The structure of the invention, as shown in FIGS. 1 to 4, inclusive, operates substantially as follows:

When water under pressure conducted through the hose 22, it enters the housing 16 in a direction indicated by an arrow A, tending to close the poppet head 26 on the seat 32. When the valve is open, water flows around the poppet head and through the openings 32 into the housing of the frame, and outwardly through the openings 80 to an area or sump, wherein water may rise and elevate the float 64. As the float 64 elevates, it moves the lever 74 upwardly until the toggle mechanism about the centers of the pins 56, 60 and 66 is moved off center permitting the spring 34, and water pressure to force the poppet head 26 closed on the seat 24, and to shut off a flow of water.

The valve may be reset by moving the lever 56 downward by manual engagement thereof at the end 74, whereupon the lever is moved from a broken line position B to a solid line position, as shown in the drawings, to reset the valve to open position, whereupon water may again flow therethrough until the float 64 trips the toggle mechanism, and permits the spring and water pressure to close the valve. It will be appreciated that the snap action closing of the valve is automatic, and in this manner, the recesses, bowls or reservoirs in gardens around the trunks of trees and in flower boxes, or the like, may be provided with sufficient water to fill them to a given level, and then the water is automatically shut off so that a given amount of water is always predetermined.

The frame 10 of the invention is small and compact, and may be readily carried around on the end of the hose 22, and placed successively in various areas, where it is desired to dispense a given amount of water during which time the operator may leave the device to shut off automatically.

In the modification of the invention as shown in FIGS. 5 and 6, a frame 82 of the invention, is similar to the frame 10, hereinbefore described. Secured in this frame is a valve housing 84, similar to the housing 16, hereinbefore described. A poppet valve seat 86 of the housing 84 is adapted to be engaged by a head 88 of the poppet valve similar to the poppet valve 26, hereinbefore described. This poppet valve 88 is provided with a stem 90 pivotally connected by a pin 92 to a toggle link 94, which in turn, is pivoted by a pin 95 to an end of another toggle link 96 having its opposite end pivotally connected by a pin 98 to an end wall 100 of the frame 82. A spring 102 interconnects the toggle link 96, and an upper wall 104 of the frame tending to move the toggle mechanism upwardly and pivoted about the pin 95 to cause axial movement of the stem 90 of the poppet valve to cause the head 88 thereof to close on the seat 86.

Connected to the toggle link 94 is a hook or latch element 106 engageable by a comparable latch element 108 carried by a float 110, which is pivoted on a pin 112 in the bottom of the frame 82. When the float moves upward to a broken line position 114, the hook or latch 108 is disengaged pivotally from the hook 106 permitting the spring 102 and water pressure to force the valve stem 90 axially, and to force the toggle links 94 and 96 upwardly to thereby permit the valve to close. A reset plunger 116 projects through the upper wall 104 of the frame housing of the invention, and may be used to force the toggle mechanism downwardly to re-engage or reset the latch hooks 106 and 108. These are tapered hooks, and tend to cam into engagement with each other.

A stop member 118 in the bottom of the frame 82 supports the float 110 in its lowermost position to enable the cam re-engagement of the hook structures 106 and 108, when the reset plunger 116 is forced downwardly to reset the toggle links 94 and 96 in position to hold the poppet head 88 in open position relative to the seat 86.

As shown in FIG. 6 of the drawings, the valve housing 84 is provided with openings 120 surrounding a bore 122 in which the valve stem 90 is reciprocally mounted. The openings 120 permit water to pass through the valve, when the poppet head 88 is in open position. When in closed position, it covers all of the openings 120.

The valve housing 84 is similar to the housing 16, and is provided with an internally screw threaded portion adapted to receive a conventional male fitting of a garden hose 22, as hereinbefore described.

In the modification, as shown in FIGS. 7 and 8, the invention is provided with a frame 124, similar to the frame 82, hereinbefore described. A valve housing 126 is similar to the valve housing 84, and a poppet valve 128 is similar to the poppet valve 88, hereinbefore described. A compression spring 130 surrounds the stem 132 of the poppet valve 128, and is secured by a washer and pin mechanism 134, similar to that disclosed in FIG. 3 of the drawings, namely, the washer 36 and pin 38. Thus, the spring 130 is disposed and abutted against the valve housing 126 at its opposite end from the washer and pin mechanism 134, and the spring in this position, tends to close the poppet head 128 on a seat 136, similar to the seat 86, hereinbefore described.

A toggle link 138 is pivotally connected by a pin 140 to the poppet valve stem 132, and a pin 142 pivotally connects the toggle link 138 with another toggle link 144, which is pivoted at its opposite end by means of a pin 146 extending through a bracket 148 carried by the frame 124.

A float 150 is pivoted at 152 in the bottom of the frame 124, and this float 150 is provided with an upwardly directed toggle engaging bearing portion 154 so located that the toggle mechanism may be in slightly over center position with respect to the pins 140, 142 and 146, tending to cause the link 138 to bear downwardly on the bearing portion 154, and to thus hold the poppet valve 128 open relative to the seat 136. Water pressure and the spring 130 tends to hold the toggle links 138 and 144 in this over center position, and when the float 150 buoyantly moves up on water, the bearing 154 forces the toggle links 138 and 144 upwardly until the center of the pin 142 passes over center relative to the pins 140 and 146, whereupon pressure of the spring 130 and water relative to the poppet head 128 causes the toggle links to snap into the broken line position C, and to permit the poppet head 128 to close relative to the seat 136, and to surround and cover the openings 156 outwardly beyond the valve stem 132, said openings 156 being similar to the openings 128, hereinbefore described.

The manual reset plunger 160 projects through the top 162 of the frame housing 124, and may be pressed downwardly in engagement with the links 138 and 144 to force them to the solid line position carrying the pin 142 into an over center position relative to the pins 140 and 146, and to cause the bearing 154 to support the links in this over center position, and to hold the poppet valve 128 open, as hereinbefore described.

It will be obvious to those skilled in the art that various modifications of the present invention may be resorted to in a manner limited only by a just interpretation of the following claims.

I claim:

1. In a float control metering and shutoff valve, the combination of: a frame; a shutoff valve supported on said frame, said shutoff valve having a movable valve element disposed to be in open or closed position; conduit means disposed to conduct liquid, under pressure, to said valve in a direction tending to close said valve; a toggle mechanism supported by said frame, and coupled to said movable element; said toggle mechanism disposed to hold said movable valve element in open position against liquid pressure; a stop means for said toggle mechanism to hold it in over center position, and to hold said valve element in said open position; a float disposed to force said toggle mechanism away from said stop and said over center position, and to permit movement of said movable valve element toward a closed position under influence of said liquid, under pressure.

2. The invention, as defined in claim 1, wherein: resilient means is disposed and tending to urge said valve element toward said closed position.

3. The invention, as defined in claim 2, wherein: a manually operable reset means is disposed to force said valve element toward an open position, and to force said toggle mechanism toward said stop means.

4. In a float control metering and shutoff valve, the combination of: a frame; a shutoff valve supported on said frame; said shutoff valve having a movable valve element disposed to be in open or closed position; a toggle mechanism supported by said frame, and coupled to said movable element; said toggle mechanism disposed to hold said movable valve element in open position; a float having latch means disposed to hold said toggle mechanism, and to hold said movable valve element in open position; means resilient urging said toggle mechanism, and said valve element toward said closed position of said valve element, when said float is actuated by fluid to release said latch means from said toggle mechanism, and to thereby permit said resilient means to move said toggle mechanism, and said valve element toward closed position.

5. The invention, as defined in claim 1, wherein: said toggle mechanism comprises a pair of toggle members pivoted together by a common pivot means, said float disposed to exert force on said toggle mechanism to cause relative pivotal movement of said toggle members about said common pivot means.

6. The invention, as defined in claim 5, wherein: said float is provided with means engaging at least one of said toggle members near said common pivot means.

7. The invention, as defined in claim 1, wherein: said toggle means is provided with a lever in connection therewith, said float adjustably movably mounted on said lever for adjustment longitudinally thereon to change the moment arm of said lever with respect to a buoyancy center of said float.

8. The invention, as defined in claim 1, wherein: said shutoff valve comprises a poppet valve seat supported by said frame, said movable valve element being a poppet head adapted to conform with said seat; a spring tending to force said poppet head closed on said seat; and hose connection means connected to said shutoff valve, and communicating with said seat.

9. The invention, as defined in claim 8, wherein: said poppet head is provided with a stem pivotally connected with said toggle mechanism, said spring surrounding said stem, and said shutoff valve being disposed to receive liquid under pressure in a direction tending to close said poppet head relative to said seat.

10. The invention, as dened in claim 9, wherein: manual reset means projects from said frame, and is disposed for manual operation to force said toggle mechanism in a direction toward said stop means, and to thereby force said poppet head to an open position relative to said seat.

11. The invention, as defined in claim 7, wherein: said lever is provided with an end portion projecting from said frame, and beyond said float, said end manually engageable for resetting said toggle mechanism, and said valve element to an open position.

12. The invention, as defined in claim 1, wherein: a spike projects from the bottom portion of said frame, and is adapted to be forced in the ground for supporting said frame in juxtaposition relative thereto.

13. The invention, as defined in claim 1, wherein: said shutoff valve comprises a seat, said movable element being a poppet, said shutoff valve disposed to receive liquid under pressure in a direction tending to close said poppet on said seat.

References Cited

UNITED STATES PATENTS

| | | | |
|---|---|---|---|
| 1,076,351 | 10/1913 | Crowell | 137—445 |
| 2,252,459 | 8/1941 | De Lancey | 137—421 XR |
| 2,684,077 | 7/1954 | Shaffer | 137—410 |
| 2,814,305 | 11/1957 | Sturman | 137—410 |
| 2,818,877 | 1/1958 | Swanson | 137—442 XR |

FOREIGN PATENTS

| | | |
|---|---|---|
| 888,137 | 8/1943 | France. |

BILLY S. TAYLOR Primary Examiner

U.S. Cl. X.R.

137—280, 426, 445